Dec. 4, 1956  W. E. LARGE  2,773,234
ELECTRIC DISCHARGE APPARATUS
Filed Dec. 29, 1951

WITNESSES:
John E. Heasley
Leon J. Taza

INVENTOR
William E. Large
BY
Hymen Diamond
ATTORNEY

United States Patent Office 2,773,234
Patented Dec. 4, 1956

2,773,234

ELECTRIC DISCHARGE APPARATUS

William E. Large, Lancaster, N. Y., assignor to Westinghouse Electric Corporation, East Pittsburgh, Pa., a corporation of Pennsylvania Application December 29, 1951, Serial No. 264,061

10 Claims. (Cl. 323—24)

My invention relates to electric discharge apparatus and has particular relation to control circuits for resistance welders.

Since the early 1930's when John W. Dawson invented his ignitron control circuit for resistance welding (Patent 2,264,175), resistance welding has been increasingly applied to the joining of metals of widely different varieties and over a wider and wider range of dimensions. Recently it has become desirable to use resistance welding for joining highly conductive metals, such as aluminum and copper, and their alloys and relatively thick materials. This use requires welding currents of very high magnitude. In fact, the currents are so high that the current carrying capacity of the ignitrons now available is far exceeded.

In accordance with the teachings of the prior art, circuits, including parallel connected ignitrons, have been provided for supplying the current for welding these highly conductive and thick materials. Such systems have serious disadvantages. At times it is essential that the ignitrons for this service be carefully selected so that their characteristics fall within a reasonable range. Such selection can be carried out only by trained personnel and is costly. The circuits for these systems are relatively complex. To prevent certain of the parallel connected ignitrons from "hogging" the current, the firing and control networks for each group of these ignitrons must include current balancing provisions, such as balancing reactors for example. These provisions introduce costly installation and maintenance requirements.

It is accordingly an object of my invention to provide a control system of relatively simple structure for a welder particularly suitable for welding thick or highly conductive materials.

Another object of my invention is to provide a control circuit of simple structure for a welder which draws welding current far exceeding the current capacity of presently available electric discharge devices, such as ignitrons.

An incidental object of my invention is to provide a high power resistance welder having a control circuit of simple and low cost structure.

Another incidental object of my invention is to provide a novel control circuit of the series transformer type for controlling the supply of current through a load.

Another ancillary object of my invention is to provide a novel transformer circuit.

In accordance with my invention, I provide a control circuit including a series transformer having a first winding and a second winding. The first winding, which may be called the primary, is connected in series with the primary of the welding transformer. The second winding, which may be called the secondary, is connected in parallel to the first winding through electric discharge means. The resulting parallel unit is connected in series with the primary of the welding transformer. The primary and secondary are so connected with respect to the special relationship of their turns that the current which flows in and out at their respective junctions is equal to the arithmetic sum of their individual currents.

When the electric discharge means is non-conductive, the secondary circuit is open and the primary presents a high impedance to current flow through the primary of the welding transformer. When the electric discharge means is conductive, the secondary circuit is closed and the impedance of the primary is substantially reduced. The turns ratio of the primary and secondary may be so selected as to provide the maximum current to the primary of the welding transformer.

Since the supply circuit through the primary of the welding transformer is at all times closed through the primary of the series transformer, magnetizing current would flow through the primary of the welding transformer even while the apparatus is quiescent. Such current would have a tendency to induce current in the secondary of the welding transformer during quiescent intervals which would tend to mar and ruin the surface of the material to be welded while the electrodes are being separated from it. The magnetizing current which would produce this difficulty is in accordance with an aspect of my invention suppressed by a contactor which is connected in parallel with the primary of the welding transformer when the apparatus is quiescent. This contactor is opened at the beginning of each weld and is reclosed after a weld is completed and the magnetizing current flows through it rather than through the primary of the welding transformer.

The novel features that I consider characteristic of my invention are set forth with particularity in the appended claims. The invention itself, however, both as to its organization and its mode of operation, together with additional objects and advantages thereof will be understood from the following description of a specific embodiment when read in connection with the accompanying drawing wherein:

Figure 1:
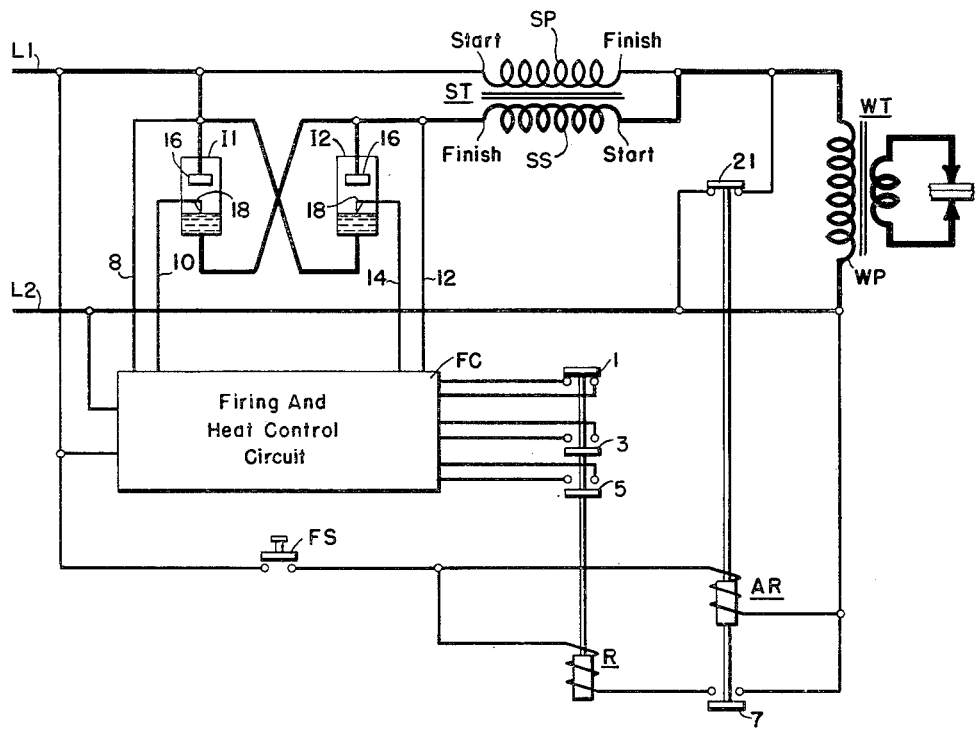
Figure 1 is a circuit diagram of a preferred embodiment of my invention.
Figure 2:
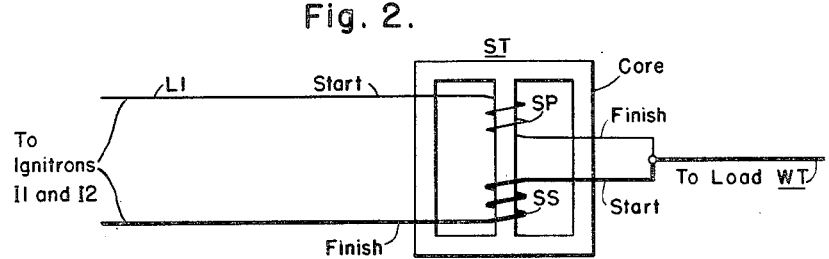
Fig. 2 is a diagram showing the construction of one component involved in the practice of my invention.

The apparatus shown in the drawing comprises a welding transformer WT, the primary WP of which is connected to a pair of supply buses L1 and L2 through the primary SP of a series transformer ST. The buses L1 and L2 may derive their power from the usual commercial 60 cycle alternating supply.

The secondary SS of the series transformer ST is connected in parallel with the primary SP through a pair of electric discharge devices I1 and I2 connected in inverse-parallel. These discharge devices may be of any general type known in the art but are preferably ignitrons.

The discharge devices are controlled in the usual manner by a firing-and-heat-control circuit FC of any type now known in the art. For example, the firing and heat control circuit may be of the type shown in Dawson Patent 2,248,968. On occasions where the highest precision is not required a firing circuit, such as is disclosed in Dawson Patent 2,264,175, or the circuit shown in Slepian Patent 2,165,911 or in Slepian Patent 2,337,842, may be utilized. Whichever firing circuit FC is used, its operation may be initiated by the opening of contact 1 and the closing of the contacts 3 and 5 of a relay R. This relay R is shown as controlled from one of the contacts 7 of an auxiliary relay AR in turn controlled from a pushbutton or foot switch FS. The relay R may also be the weld relay of a sequence timer, such as the relay 111 of Hartwig Patent 2,533,369, with proper contacts.

Fig. 1 is prepared for a circuit FC, such as is shown in Patent 2,248,968. The conductors 8 and 10 and 12 and 14 from the anode 16 and the igniter 18 of each of the devices I1 and I2, respectively, correspond to the leads from the anode 17 and the igniter 21 of Dawson's ignitrons 13 and 15. The contacts 1, 3 and 5 of the relay R correspond to Dawson's contacts 45, 69 and 53, respectively. The circuit FC is powered in the same manner from lines L1 and L2 as is Dawson's current from lines 5 and 7.

To suppress the flow of magnetizing current while the apparatus is quiescent, a contact 21 of the auxiliary relay AR is connected in parallel with the primary WP of the welding transformer WT. The magnetizing current of the series transformer ST is transmitted through this contact.

When the apparatus is quiescent, the auxiliary relay AR is deenergized and the primary WP of the welding transformer WT is shunted out by it. The electric discharge devices 11 and 12 are non-conductive and the series transformer ST constitutes a high impedance in the circuit of the primary of the welding transformer because the secondary SS of the series transformer is open circuited. The magnetizing current conducted by the primary of the series transformer flows through the contact 21 of the auxiliary relay AR.

To initiate a welding operation, the pushbutton or foot switch FS is closed. The auxiliary relay AR is energized opening its normally closed contact across the primary WP of the welding transformer WT and closing its normally open contact 7 in series with the coil of the relay R. The circuit FC is now actuated and the ignitrons I1 and I2 are fired in the usual succession. The impedance of the series transformer ST is now substantially reduced and substantial current flows through its primary SP. The secondary SS of the series transformer ST is connected oppositely to the primary SP so that the current flowing through the secondary SS is added to the current flowing through the primary SP in the conductor to the primary WP of the welding transformer WT. A current of very large magnitude then flows through the primary of the welding transformer and the material is welded. The relationship between the direction of the windings of the primary SP and secondary SS is shown in the drawing.

At the termination of a weld the foot switch or pushbutton FS may be opened and the relays AR and R deenergized. The firing of the electric discharge devices I1 and I2 is now interrupted and the impedance of the series transformer ST becomes high so that the current flow through it is reduced. In addition, the primary WP of the welding transformer is shunted by the contact 21 of the auxiliary relay AR and any magnetizing current flowing through the primary SP of the series transformer is conducted by the shunt contact 21. The current flow through the primary of the welding transformer is then substantially zero, and the welding electrodes may be opened without damaging the weld which has been made.

The specific aspects of my invention are embodied in the apparatus described above. Certain modifications of this apparatus within the broader aspects of my invention may be made. For example, the shunting contactor may be replaced by electric discharge means, specifically a pair of discharge devices connected in inverse-parallel. These devices would be energized in a welding operation during the intervals when the apparatus is quiescent. Since during these intervals the current conducted by the primary of the series transformer is relatively small, the shunting device may be of relatively low current carrying capacity.

Although I have shown and described a specific embodiment of my invention, I am fully aware that many modifications thereof are possible without departing from the spirit of the invention. My invention is, therefore, not to be limited except as is necessitated by the prior art and by the spirit of the appended claims.

I claim as my invention:

1. Apparatus for controlling the supply of current to a welding transformer having a primary comprising terminals for deriving current, a controlling transformer having a first winding and second winding means for connecting said first winding in series between said terminals and said primary, means for closing the circuit of said second winding during active intervals and maintaining it open during intervening quiescent intervals and means for preventing current from flowing through said primary during said quiescent intervals.

2. Apparatus according to claim 1 characterized by the fact that the means for preventing current from flowing through the primary is a contactor normally connected in shunt with said primary and by means for opening said contactor during the active intervals and permitting it to reclose during the quiescent intervals.

3. Apparatus for controlling the supply of current from the terminals of an alternating-current source to the primary of a welding transformer comprising in combination, a controlling transformer having a first winding and a second winding; means directly connecting said first winding, said primary and said terminals in series; a pair of electric discharge paths each defined by an anode and a cathode connected in inverse-parallel; means connecting said terminals, said discharge paths, said second winding and said primary in series; said last named connecting means also including means for connecting said discharge paths and said second winding across said first winding; and means for rendering said discharge paths conducting during successive alternate half periods of said source.

4. In combination, a pair of terminals for supplying a potential; an alternating transformer having a first winding and a second winding; a pair of electric discharge paths each defined by an anode and a cathode connected in inverse-parallel; means connecting said paths, said second winding and said first winding in a closed network; means for connecting in series said terminals, said network and a load, and means for rendering said paths conducting during successive alternate half periods of said potential.

5. The apparatus of claim 3 wherein the windings of the controlling transformer are connected so that the current flowing through the first winding to the primary is in phase with the current flowing through the second winding to the load.

6. The apparatus of claim 3 wherein the opposite polarity ends of the windings of the controlling transformer are connected together by the connecting means.

7. Apparatus for controlling the supply of current from the terminals of a source to the primary of a welding transformer comprising in combination, a controlling transformer having a first winding and a second winding; means for directly connecting said first winding, said primary and said terminals in series; means, including a pair of electric discharge paths each defined by an anode and a cathode connected in inverse-parallel, for connecting said second winding across said first winding; means for rendering said discharge paths conductive in succession for predetermined active intervals of time and maintaining them non-conductive during intervening quiescent intervals of predetermined duration and means for shunting said primary out during said quiescent intervals.

8. The apparatus of claim 4 wherein the opposite polarity ends of the windings are connected by the connecting means.

9. In combination, a pair of terminals for supplying an alternating potential; a transformer having a first winding and a second winding; means connecting said first winding to one of said terminals; a pair of electric discharge paths each defined by an anode and a cathode connected in inverse-parallel; means including said paths for connecting said second winding directly across said first winding, a normally closed contactor connected between said first winding and said other terminal, and means for rendering said paths conducting during successive alternate half periods of said potential.

10. In combination, a transformer having a first winding and a second winding and connections including a pair of electric discharge paths each defined by an anode and a cathode connected in inverse-parallel, for directly connecting said second winding in parallel with said first winding, means for supplying alternating current to the network including said paths, said first winding and said second winding, and means for rendering said paths conducting during successive half periods of said alternating current.

References Cited in the file of this patent

UNITED STATES PATENTS

| | | |
|---|---|---|
| 1,857,576 | Voorhoeve | May 10, 1932 |
| 2,120,564 | Lord | June 14, 1936 |
| 2,543,114 | Lexa | Feb. 27, 1951 |